Figure 3:
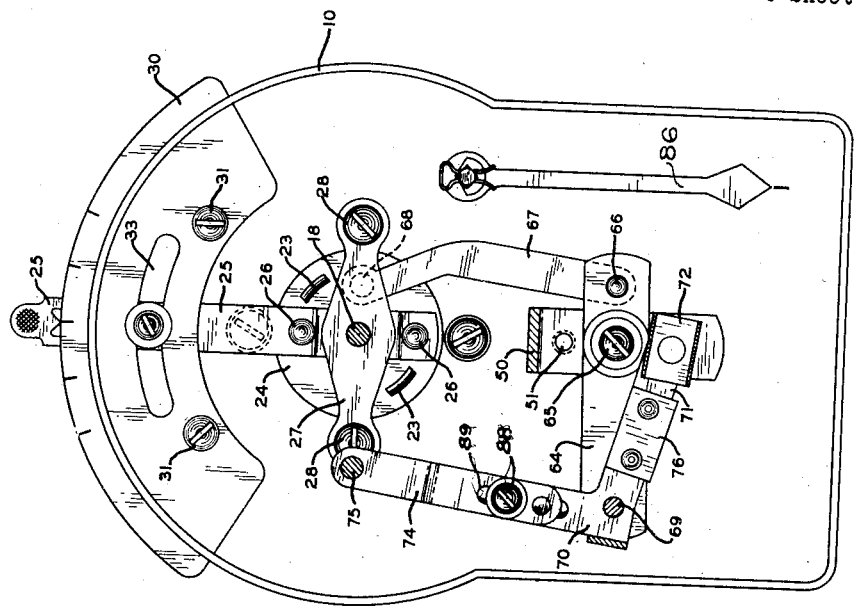

June 14, 1938.  C. G. KRONMILLER  2,120,937
STOKER CONTROL
Filed Feb. 19, 1936   3 Sheets-Sheet 1
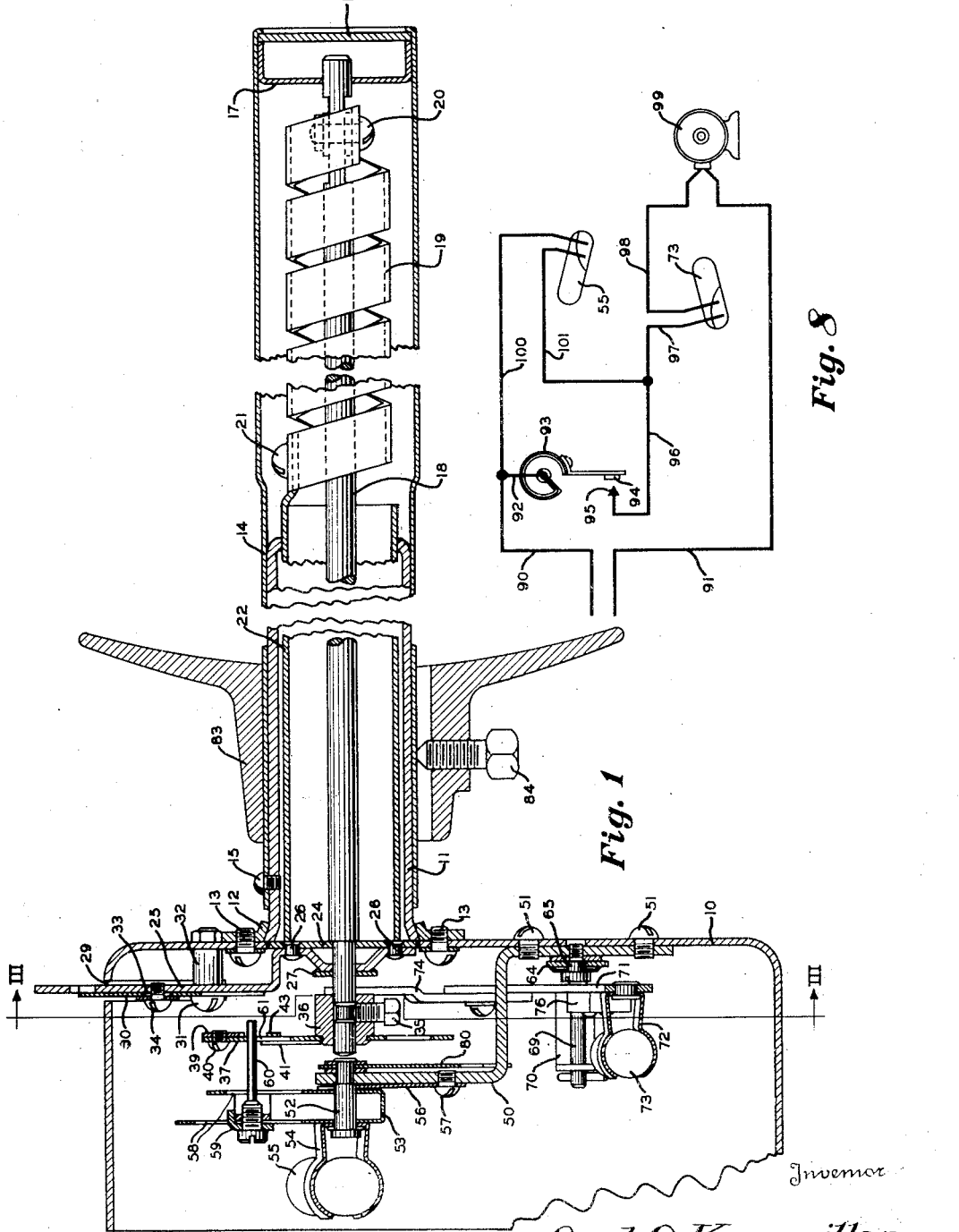

June 14, 1938.                C. G. KRONMILLER                2,120,937
                                STOKER CONTROL
                             Filed Feb. 19, 1936            3 Sheets-Sheet 2

Inventor

Carl G. Kronmiller

By George H. Fisher

Attorney

June 14, 1938.  C. G. KRONMILLER  2,120,937
STOKER CONTROL
Filed Feb. 19, 1936  3 Sheets-Sheet 3
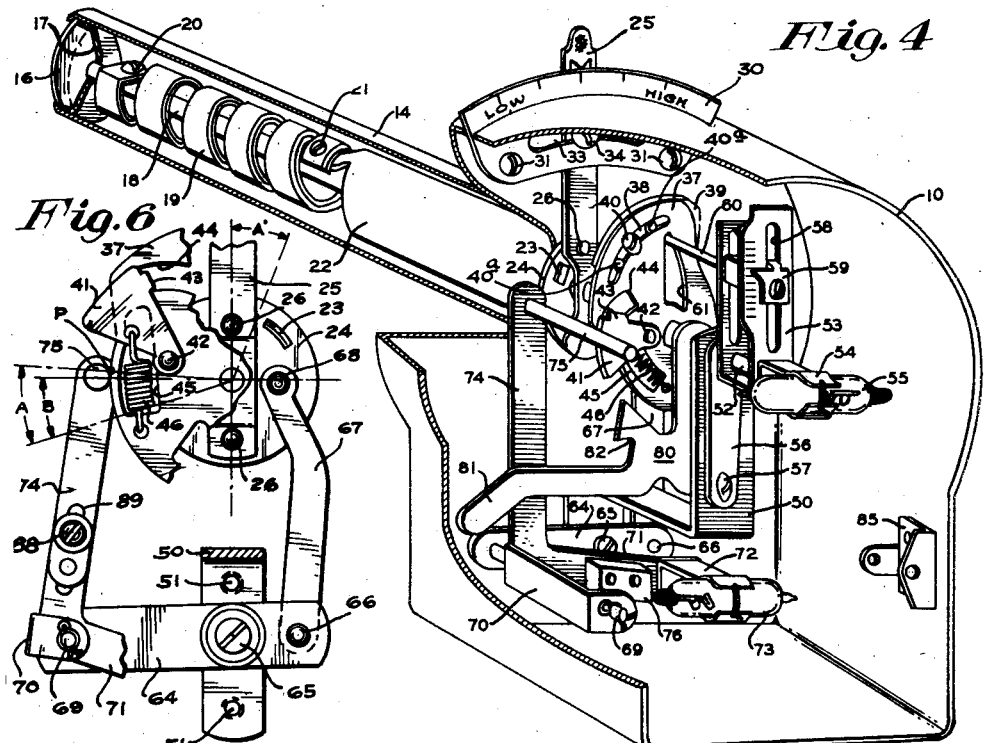
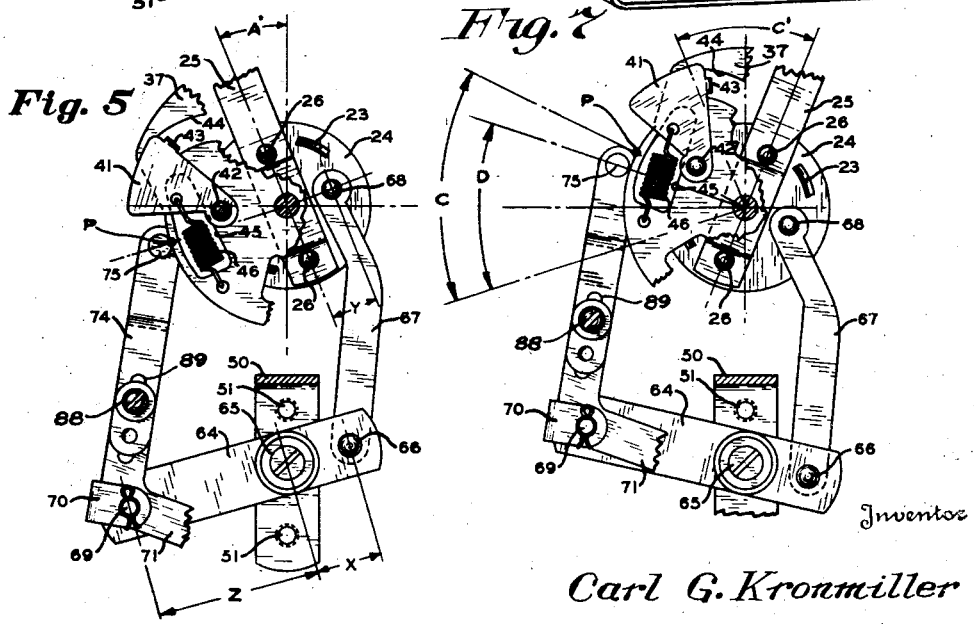
Inventor
Carl G. Kronmiller
By George H Fisher
Attorney Patented June 14, 1938

2,120,937

UNITED STATES PATENT OFFICE 2,120,937

STOKER CONTROL

Carl G. Kronmiller, Minneapolis, Minn., assignor to Minneapolis-Honeywell Regulator Company, Minneapolis, Minn., a corporation of Delaware Application February 19, 1936, Serial No. 64,669

17 Claims. (Cl. 200—139)

This invention relates to control mechanism and more particularly to that type of device wherein circuit controlling mechanism is actuated by the reaction of a condition responsive element to changes in the value of a condition.

A primary object of this invention is the provision, in a control mechanism including a plurality of actuating mechanisms adapted to respond to a plurality of predetermined conditions, of means to vary the predetermined conditions in such a manner that certain of said conditions are varied in a greater or less amount than others.

A further object is the provision, in a circuit controlling mechanism including a plurality of switches adapted to respond to a plurality of predetermined condition values, of means to vary the values in varying amounts in such manner that when one of the values is increased or decreased, the corresponding value will increase or decrease a relatively greater or less amount.

Another object is the provision in a switching mechanism comprised of a plurality of switches, one of which responds at different predetermined temperature values between relatively small limits, and another of which responds to predetermined temperature values between relatively great limits, of means whereby upon change in the relatively small limits, the relatively great limits are also changed but by a lesser amount.

A more specific object is the provision of a control mechanism embodying, in a single relatively compact unit, an improved mechanism particularly suitable for use with fuel burners adapted to accomplish all the above and other objects.

As conducive to a clearer understanding of this invention, it may here be pointed out that in a control mechanism adapted to regulate combustion, as by means of an automatic stoker, it is desirable that there be provided a switching mechanism adapted to control the feeding of fuel to a fire within the normal operating limits of the device in order to maintain combustion through intermittent fuel feeding in the absence of extraneous demands upon the stoker motor, as may be occasioned by a conventional room thermostat. It is also desirable to provide additional mechanism whereby, should the temperature of the source of heat reach a point so high as to endanger the operating mechanism, the supply of fuel will be cut off, and further, it has been found advantageous to provide an additional motor cut-off which will operate when the temperature reaches a point so low as to indicate that the fire has become extinguished, to preclude feeding of fuel to a dead fire. In such devices as have hitherto been known, there has been provided suitable means whereby the normal operating limits of a switching mechanism may be varied in accordance with the particular requirements of the specific installation. Such a variation has, however, hitherto raised the uppermost limit or high limit cut-off of the mechanism a corresponding amount, and it has frequently happened that upon such increase, the temperature necessary to actuate the high limit cut-off has been increased above the danger point with resultant damage to the apparatus. Further, in the prior art devices, upon an increase in the normal operating range of the device the operating temperature, which operates to discontinue fuel feeding when the fire is out, has also been increased correspondingly, frequently to such a point that the mechanism has been stopped while the fire was still burning.

It is an object of this invention to provide suitable means whereby upon change in the temperature values comprising the combustion-maintaining operating limits of the mechanism, temperature values to which the above mentioned two cut-offs respond will also be changed, but by a lesser amount, whereby the above mentioned difficulties are precluded, to provide constant efficient control of the factors above mentioned.

A specific object of the invention is the provision of means whereby upon an increase in the temperature values to which the combustion maintaining mechanism responds in a fixed amount, as illustratively 50 degrees, the temperature values to which the high limit cut-off and the cut-off which serves to preclude feeding of fuel to a dead fire respond are also increased but by a lesser amount, as, illustratively, 25 degrees.

A more specific object is the provision of an improved switching mechanism which will achieve all the above objects and others which will in part be obvious and in part pointed out as the description of the invention proceeds.

The invention, accordingly, consists in the features of construction, combinations of elements and arrangements of parts as will be exemplified by the structure to be hereinafter described and the scope of the application of which will be indicated in the appended claims.

Figure 2:
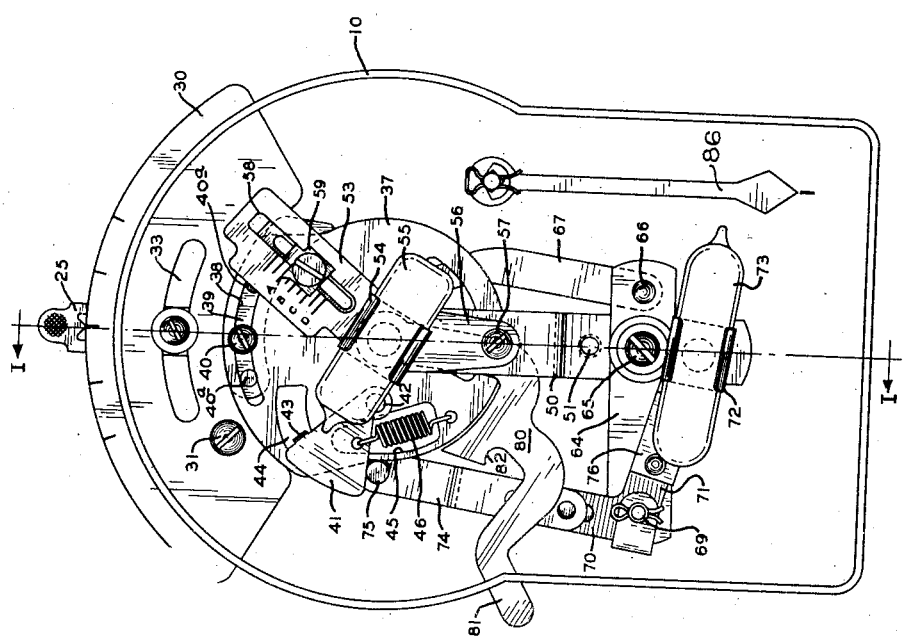

In the accompanying drawings in which is disclosed one of the various possible embodiments of this invention:

Figure 1 is a vertical side sectional elevation taken along line 1—1 of Figure 2 showing one form of apparatus embodying the inventive concept, Figure 2 is a front elevational view of Figure 1 as viewed from the left, Figure 3 is a vertical sectional view taken substantially along line III—III of Figure 1, Figure 4 is a perspective view of the structure, certain portions thereof being broken away to show more clearly certain features of construction, Figures 5, 6 and 7 are partial sectional views showing portions of certain of the structure of the instant invention in different positions, and Figure 8 is a wiring diagram showing one form of control circuit suitable for use in connection with the device of the instant invention.

Referring now to the drawings and more particularly to Figure 1, a casing is generally indicated at 10. A supporting sleeve 11 carries a flared bushing at one extremity and is mounted upon and secured to casing 10, as by means of a flanged annulus 12 abutting the flared bushing, and screws 13. A sleeve 14 of a length sufficient to extend a substantial distance from the rear wall of casing 10, is secured to the outer surface of supporting sleeve 11, by any suitable means such as a screw 15, and has a closure member 16 suitably positioned at its outer extremity. A bearing 17 mounted within sleeve 14 adjacent closure member 16 rotatably supports one end of a torsion rod 18 which extends longitudinally through sleeves 14 and 11 into casing 10 for a purpose to be more fully described hereinafter. A bimetallic helix 19 is positioned about rod 18 within sleeve 14. One end of helix 19 is secured to rod 18 adjacent bearing 17 by any suitable means such as a nut and screw 20. The opposite end is secured as by a screw 21 to a suitable projection extending from the outer end of a sleeve 22 mounted within sleeve 11. The opposite end of sleeve 22 extends to a point adjacent the rear wall of casing 10 and is secured, in any desired manner, to a disc 24. Such securing means may take the form of inwardly turned prongs 23 inserted in suitable apertures in disc 24 to hold sleeve 22 and disc 24 in relatively fixed related assembly. An adjusting lever 25, one end of which extends exteriorly of casing 10 through a slot 29, is rigidly affixed at the opposite end to disc 24 as by rivets 26. A bridge member 27 is mounted, as by screws 28, adjacent the rear wall of casing 10 in such a manner as to abut lever 25 and hold disc 24 rotatably against the inner peripheral surface of sleeve 11.

A dial plate 30 carrying suitable indicia thereon also extends through slot 29 adjacent lever 25. Dial plate 30 may be held in related assembly with casing 10 in any suitable manner such as by screws 31 and spacer sleeves 32. A slotted aperture 33 in dial plate 30 is adapted to accommodate a positioning screw 34 which threadedly engages a suitable threaded opening in lever 25.

It will now be seen that a temperature change will cause a contraction or expansion of bimetallic helix 19, which, in turn, will cause rotation of rod 18. It will also be seen that sleeve 22 is rotatably associated with the rear wall of casing 10 by means of disc 24 and normally held stationary through frictional engagement of the parts including screw 34 in aperture 33. It will further be seen by reference to Figure 2 that lever 25 may be moved either to the right or to the left of its mid position, such movement being limited by the abutment of screw 34 with the ends of aperture 33. The motion of lever 25 will be imparted through disc 24 and helix 19 and their associated connections to rod 18, which will be correspondingly rotated to change the position of certain mechanism, to be hereinafter described, associated with the end of rod 18 which extends into casing 10. As the mechanism in casing 10 is responsive to temperature change, the device may be calibrated and the indicia carried by dial plate 30 may take the form of previously determined temperature designations to indicate that the mechanism will respond to a relatively low temperature when lever 25 is, illustratively, in its left hand position and a relatively high temperature when lever 25 is in its right hand position.

The inner end of rod 18 which extends, as above stated, through disc 24 into casing 10 carries a collar 36 (Figure 1) which may be adjustably positioned with respect to rod 18 and held against rotation thereon by any suitable means, such as a set screw 35. A cam member 37 having a high and two low operating surfaces is rigidly secured to collar 36 in such a manner that rotation of rod 18 is directly imparted thereto. The upper portion of cam 37 carries a slotted aperture 38 (see Figure 2) which has passed therethrough a screw 40 which threadedly engages a suitable threaded opening in a second cam member 39 positioned adjacent and to the rear of cam 37. Cam 39 has a high surface which may be adjustably positioned with respect to the high surface of cam 37 by variation of the position of screw 40 in slot 38 in a manner and for a purpose to be described hereinafter. Suitable lugs 40a formed on cam 39 and adapted to be positioned in slot 38 hold cam 39 against rotation about screw 40. A third cam member 41 which is rotatably mounted on cam 37 adjacent the junction of a high and a low surface, as by means of a pivot pin 42, has an inwardly turned projection 43 thereon which enters and engages with a suitable slot 44 in cam 37 whereby to limit the pivotal movement of cam 41 with respect to cam 37. As best shown in Figure 2 a third aperture 45 is cut into cam 37 adjacent cam 41 to accommodate a spring 46, one end of which is secured in any suitable manner to cam 41 and the other end of which is secured to cam 37 adjacent the end of aperture 45 disposed away from cam 41. Spring 46, accordingly, tends to hold cam 41 in an extended position with respect to the periphery of cam 37 but is adapted to yield upon application of pressure to cam 41 in an upward direction, as viewed in Figure 2, in a manner and for a purpose to be more fully described hereinafter. The cam surface of cam 41 is of a radial extent slightly less than the high surface of cam 37 whereby upon continuation of such upward pressure, as above mentioned, which is occasioned by rotation of the cam assembly adjacent a relatively fixed cam follower to be described hereinafter, the source of pressure will ultimately engage the high surface of cam 37 when cam 41 has reached the limit of its pivotal movement and permit cam 41 to be returned to extended position by spring 46.

As best shown in Figures 1 and 4, a support 50 is secured to the rear wall of casing 10 in any suitable manner as by screws 51 and extends therefrom forwardly and upwardly to a position adjacent, and in front of, the inner extremity of rod 18. A stud shaft 52 is suitably mounted in support 50 in substantial alignment with rod 18. Stud shaft 52 has mounted thereon a U shaped or bifurcated member 53 which carries a mercury switch clip 54 adapted to hold a mercury switch 55. Support 50 has mounted thereon in any suitable manner, as by a screw 57, a leaf spring 56 adapted to bear against the inner arm of member 53 in order that rotation imparted to member 53 in a manner hereinafter described will in turn be imparted through the frictional engagement of member 53 and clip 54 occasioned by the pressure of spring 56, to mercury switch 55. The pressure provided by spring 56 also serves to hold switch clip 54 in any of its tilted positions. Bifurcated member 53 is provided with suitable correlated slots 58 in the bifurcations thereof, as best shown in Figure 4, and bears suitable indicia adjacent an edge of the foremost of slots 58. A pin 60 having a cross-head 59 secured to one end extends rearwardly through slots 58 into an irregularly shaped aperture 61 in cam 37. Aperture 61 is substantially in the shape of a triangle having the apex at the top. Cross-head 59 carries a suitable pointer adapted to cooperate with the indicia carried by member 53 adjacent the foremost of slots 58. The position of the cross-head 59 with respect to the indicia adjacent slot 58 serves to indicate the relative position of pin 60 with respect to aperture 61 to indicate, as will be explained hereinafter, the relative differential between the temperature values to which switch 55 responds. Cross-head 59 and hence pin 60 may be moved vertically in slots 58, and, accordingly, in aperture 61, and when pin 60 is in the position as shown in Figure 4, the engagement of the sides of opening 61 therewith will impart motion thereto from cam 37 and through the frictional connection above described to mercury switch 55. However, upon movement of cross-head 59 downwardly in slots 58, pin 60 will move towards the base of triangular opening 61, and as such motion progresses, a progressively increasing lost motion connection will be established between cam 37 and mercury switch 55 according to the distance between the walls of opening 61 at the point at which they engage pin 60. Accordingly, when pin 60 is adjacent the base of triangular opening 61, a substantial rotation of cam 37 is required to impart motion to switch 55 but when pin 60 is at the apex of triangular opening 61, as shown in Figure 4, a slight rotation of cam 37 is immediately transmitted to switch 55.

It will be seen from the foregoing, that since cam 37 is rotated by rod 18, which is in turn rotated in response to temperature changes acting upon bimetallic helix 19, mercury switch 55 is opened or closed by variations in the temperature in the space adjacent helix 19, and it will further be seen that mercury switch 55 may be so adjusted, through the pin and aperture connection above described as to open or close within a relatively narrow temperature differential when the parts are in the position shown in Figure 4, or within an increasingly wide temperature differential as pin 60 is moved toward the base of triangular opening 61.

As best shown in Figures 2 and 3, a lever 64 is pivotally mounted as by a pivot 65 on support 50 and carries adjacent an extremity a second pivot 66 by means of which it is connected to a link 67. The end of link 67 opposite pivot 66 is pivoted, as at 68, to disc 24. The opposite end of lever 64 has pivotally mounted thereon, as by pivot pin 69, a bell-crank member 70 having a laterally extending arm 71 and a vertical extending arm 74. Arm 71 has mounted thereon a mercury switch clip 72 adapted to carry a mercury switch 73. Arm 74 carries a pin 75 which is normally held in yieldable engagement with the peripheral surface of the cam assembly comprised of cams 37, 39 and 41, through the gravitational pull of a weight 76 mounted on arm 71, in a manner and for a purpose as will appear hereinafter.

From the foregoing it will be seen that rotation of disc 24 imparted by means of lever 25 will be transmitted to pin 75 through link 67, lever 64 and bell-crank member 70 to vary the position of pin 75 with respect to the peripheral surface of the cam assembly.

A latching lever 80, having a handle portion 81, adapted to extend exteriorly of casing 10 through a suitable slotted aperture, and a latching surface 82 adapted under certain circumstances hereinafter described to engage with pin 75, is pivotally mounted on stud shaft 52.

Referring now to the wiring diagram shown in Figure 8, wires 90 and 91 lead from a suitable source of power (not shown). Wire 90 is connected through wire 92 to a condition responsive element 93 which may take the form of a conventional thermostat 93. Thermostat 93 carries a contact 94 adapted to engage opposed contact 95 upon a predetermined drop in temperature in a space the temperature of which it is desired to control by the conjoint action of thermostat 93 and the mechanism of the instant invention. Contact 95 is connected through wires 96 and 97 to one electrode of mercury switch 73, the other electrode of which is connected through a wire 98 to a suitable operated mechanism, such as a motor 99 which may be adapted to operate an automatic stoker or other desired mechanism to feed fuel to a fire. Line wire 91 is connected directly to motor 99 so that when switch 73 and thermostat 93 are both closed an energizing circuit is completed from the source of power through wires 90 and 92, thermostat 93, contacts 94 and 95, wires 96 and 97, switch 73, wire 98, motor 99 and wire 91 back to the source of power to actuate motor 99. Wire 100 leads from the junction of wires 90 and 92 to one electrode of mercury switch 55, the other electrode of which is connected through wire 101 to the junction of wires 96 and 97. It will thus be seen that mercury switch 55 is in parallel with thermostat 93 whereby upon closure of mercury switches 55 and 73, motor 99 may be actuated even though contacts 94 and 95 are open. Conversely, as above pointed out, if contacts 94 and 95 are closed and switch 73 is closed, motor 99 may be actuated even though switch 55 is open. It will further appear, however, that motor 99 cannot be actuated in any manner while switch 73 is open since switch 73 is in series with both thermostat 93 and switch 55.

From the foregoing it will be seen that the actuation of stoker motor 99 is controlled by the three elements, thermostat 93 and mercury switches 55 and 73. It will also appear that thermostat 93 controls motor 99 in order to feed fuel to a source of combustion and regulate the temperature in the space adjacent thermostat 93. Mercury switch 55 is adapted through the mechanism above described to provide sufficient fuel to maintain combustion under temperature conditions such that no call for heat is made by thermostat 93, while switch 73 serves a dual function in that it provides a safety device to prevent overheating, as above explained, and also provides a control adapted to preclude operation of the stoker motor when the fire is out.

Now having particular reference to Figure 2, the parts are shown in the position they will assume when the fire is out, switch 73 is open accordingly, and the device cannot be operated to actuate stoker motor 99. Assuming that it is now desired to place the device in operation, handle 81 is raised to cause latching surface 82 to engage pin 75 and hold the same away from the peripheral surface of the cam assembly. This latching operation likewise raises arm 71 to move mercury switch 73 to closed position. The fire is now manually started and upon an increase in temperature in the flue or furnace, wherein is mounted bimetallic helix 19, the cam assembly is caused to rotate in a counter-clockwise direction, as seen in Figure 2, until the abutment of the high surface of cam 37 engages pin 75 and forces the same out of latching engagement with latching surface 82 whereupon latching member 80 will fall about its pivot on stud shaft 52 and the apparatus will be in condition for automatic operation. Upon a continued rise in temperature, the cam assembly continues to rotate in a counter-clockwise direction until switch 55 is opened in the manner above described. Under certain circumstances as when contacts 94 and 95 are also open such opening of switch 55 will discontinue operation of stoker motor 99 and the temperature will drop until switch 55 recloses whereupon the stoker motor will again be operated to feed fuel to the fire and raise the temperature. Assuming, however, that the opening of switch 55 does not deenergize the stoker motor, which is the case when thermostat 93 indicates a low temperature in the space to be heated, the cam assembly will continue to rotate in a counter-clockwise direction until pin 75 rides down the edge of cam 39 and abuts the opposite low surface of cam 37 whereupon switch 73 will be opened to stop stoker motor 99 and the temperature will decrease. Pin 75 will then ride up cam 39 to reengage the high surface of the cam assembly.

It may here be pointed out that cam 39 may be adjusted with respect to cam 37 by means of screw 40 as previously set out in order to vary the high temperature value at which switch 73 opens. It will be seen that as screw 40 is positioned toward the right in slot 38, as seen in Figure 2, the position of the high surface of cam 39 is extended with respect to the high surface of cam 37 to increase the peripheral extent of the high surface area of the cam assembly. Accordingly, as the high surface is extended it will be seen that a greater rotation of the cam assembly caused by a correspondingly high temperature is necessary to permit pin 75 to engage the low surface of cam 37 adjacent cam 39. Conversely, as screw 40 is moved towards the left end of slot 38 a proportionally lower temperature value will permit opening of switch 73 through the movement of pin 75.

Upon further decrease in temperature, the cycle of operation previously discussed in connection with switch 55 will be repeated. It will now be seen that even in the complete absence of a demand for heat placed upon stoker motor 99 by thermostat 93, the opening and closing of switch 55 serves normally to maintain a low fire in the furnace at all times.

If, however, for any reason the fire goes out, the cam assembly rotates in a clockwise direction until the parts assume the position shown in Figure 2 whereupon switch 73 opens to deenergize the stoker motor and prevent the feeding of fuel to a dead fire. Should such a drop in temperature as to permit pin 75 to ride over cam 41 into engagement with a low surface of cam 37 result from other causes than the extinguishing of the fire, and a subsequent rise in temperature take place, it will be seen that the cam assembly may rotate in a counter-clockwise direction and pin 75 force cam 41 inwardly against the pressure of spring 46 until the high surface of cam 37, which is as previously stated slightly higher than the surface of cam 41, is engaged, whereupon cam 41 will be pulled into its extended, or normal, position by spring 46 and automatic operation will be resumed. If, however, the fire is actually out, the fire must be rekindled manually and the device reset as above described by means of latching member 80. It will be apparent, however, that if the fire is manually rekindled and the operator inadvertently fails to set latching member 80, that a rise in temperature in the flue will cause pin 75 to force cam 41 inwardly in the manner above described and cause the device to resume its automatic cycle of operation.

Referring now to that portion of the mechanism comprised of lever 64, link 67, and bellcrank member 70 which is adapted to vary the differential between the temperatures at which mercury switches 55 and 73 operate, in Figure 6, lever 25 and its associated mechanism are shown in their mid position which is, under average circumstances, the normal operating position of the device. However, under certain circumstances, it may be desirable to vary the temperature values within which stoker motor 99 operates. In Figure 5 a portion of the control mechanism is shown with lever 25 and its associated mechanism including disc 24, link 67, lever 64, bellcrank member 70, and pin 75 adjusted to a low temperature control position, and in Figure 7 to a high temperature control position.

Having particular reference to Figure 5, it will be noted that the distance between the center line of rod 18 and the center line of pivot 68 designated at Y is less than the distance between the center lines of pivots 65 and 66 designated at X, whereas the radius of the cam surface of cam 37 is substantially equal to the distance between the center lines of pivots 65 and 69 designated at Z. With the relationship of parts as above described, it will be seen that a given amount of movement imparted to disc 24 through lever 25 results in lesser movement of lever 64, which in turn will result in a lesser movement of pin 75.

In order to illustrate more clearly this relationship, assume that the temperature in space adjacent helix 19 is constant. In Figure 5, the mechanism is shown in a position of adjustment adapted to be actuated by a low temperature. The center line of pin 75 is in alignment with a point P which may be any given point on the arcuate surface of cam 37. Assuming that it is now desired to adjust the mechanism to its midpoint setting, adjusting lever 25 is moved through an angle A' which causes disc 24 and cam 37, and consequently point P, to move through a corresponding angle designated at A. Due to the relationship of the distances X and Y above discussed, the center line of pin 75 will, however, be moved through an angle B which it will be seen, by reference to Figure 6, is less than the angle A.

If it is now desired to adjust the mechanism to a high temperature position, lever 25 is moved to the extreme right as shown in Figure 7, or a total distance from the position shown in Figure 5 equal to the angle C'. This movement will cause point P to move through a corresponding angle C for the same reason as above mentioned in connection with the position of the mechanism shown in Figure 6, whereas the center line of pin 75 will be moved through a lesser angle D. It will, therefore, be seen that movement of lever 25 results in movement to the same degree of cam 37 and also in movement of pin 75, but in a lesser degree.

While in the drawings there are shown but three positions of adjustment, it will be readily understood that movement of lever 25 from any given position to any other position will result in a corresponding amount of movement of cam 37 and a lesser amount of movement of pin 75.

The relationship of the movement of switch 55 with respect to any given point on the peripheral surface of the cam assembly may be varied by adjustment of the lost motion connection comprised of pin 60 and triangular aperture 61, since it will be seen that with pin 60 in the lower portion of aperture 61, the amount of movement of cam 37 with respect to the amount of movement of lever 25 will be decreased by the amount of motion lost. The position of pin 75 with respect to point P may be varied by means of a set screw 88 movable in a slotted aperture 89 in leg 74 of bell-crank member 70. Such adjustment will also result in a variation in the operating temperature values of switch 73 since the amount of movement necessary to cause a high surface of the cam assembly to be juxtaposed to pin 75 will be varied by any change in the relative position of the parts.

From the foregoing it will be seen that since the actuation of switch 55 is determined by the position of the cam assembly and that since the actuation of switch 73 is determined by the position of pin 75, a change in the relative position of pin 75 with respect to any given point on the surface of the cam assembly will result in a variable differential between the temperature values to which switch 55 responds and the temperature values to which switch 73 responds.

In order to distinctly point out the operation of the above mechanism with respect to a change in temperature values, a series of typical temperature indications are tabulated below, in which Column A indicates the temperature value at which switch 55 closes, Column B the temperature value at which switch 55 opens, Column C the low temperature value at which switch 73 opens, and Column D the high temperature value at which switch 73 opens. Column E indicates the differential between A and C, and Column F the differential between A and D.

| A | B | C | D | E | F |
| --- | --- | --- | --- | --- | --- |
| 125 | 150 | 90 | 800 | 35 | 675 |
| 175 | 200 | 115 | 825 | 60 | 650 |
| 225 | 250 | 140 | 850 | 85 | 625 |

As will be noted from the above, temperature values in Column C increase relatively as the temperature values in Column A are increased and the temperatures in Column D increase relatively as the temperatures in Column B are increased. But the differential between the values in Column A and values in Column C as shown in Column E is constantly increased, while the differential between the values in Columns B and D is constantly decreased as shown by Column F. As the temperature values to which switch 55 responds as indicated in Columns A and B are increased in amounts of 50°, the high and low values at which switch 73 opens, as indicated in Columns D and C respectively, are also increased, but only in amounts of 25°.

From this it will be seen that, were it possible to increase the temperatures to which switch 55 responds above the limits provided for by the mechanism, theoretically in the absence of such extraneous factors as normal variation in the curve of movement of helix 19 which need not be considered here, the temperatures of Column B and Column D would eventually equalize. It will further appear that as the temperatures in Column A increase, the temperatures in Column C, while constantly increasing, will, within the normal operative limits of the device, never reach such a point that switch 73 is opened at a value indicative of normal combustion temperature.

The above feature is of primary importance in a device such as the stoker control mechanism herein described, in that it is often desirable to vary the temperature at which switch 55 operates in order that the fire may be held at a relatively high temperature, but under such circumstances in devices of the prior art the two temperature values at which a switch such as 73 operated to deenergize the stoker motor were increased a correspondingly great amount. Accordingly, it frequently happened that switch 73 opened and discontinued the feeding of fuel to a fire while the fire was still burning, and it also frequently happened that the temperature in the area containing the thermal element corresponding to helix 19 was allowed to increase to such a point that the element was irreparably damaged. It will be seen that the instant structure obviates the above difficulties.

Sleeve 14 may be secured in any suitable place, as in a boiler or a stack of a furnace, by any suitable means such as, illustratively, a flange 83 adjustably secured to sleeve 14 by such means as a screw 84.

As seen in Figure 4, brackets 85 which may support a mounting block (not shown) and a cover plate (not shown) are secured to casing 10.

A conventional alignment pendulum 86 may be pivotally secured to casing 10 in any desired manner.

From the foregoing it will now appear that there is herein provided a mechanism which achieves the objects of this invention including many features and advantages of great practical importance.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim as my invention:

1. In a control mechanism, in combination, a thermostatic element, a switch actuated by said element and operable to deenergize and energize a source of heat on temperature rise and fall respectively, to predetermined upper and lower limits, a second switch also actuated by said element adapted to remain closed during temperature rise and fall within said limits but operable to deenergize said source of heat upon temperature rise or fall to additional predetermined upper and lower limits in excess of said first mentioned limits, and a single means to raise and lower said first mentioned predetermined upper and lower limits and said additional predetermined limits, said means being so arranged that upon variation of said first mentioned limits said additional limits are varied in differential ratio whereby as said upper limits are raised said difference therebetween tends to converge and as said lower limits are correspondingly raised said difference therebetween tends to diverge.

2. In a control mechanism, in combination, a switch operable to close and open a circuit on temperature rise and fall respectively to predetermined upper and lower limits, a second switch adapted to remain closed during temperature rise and fall within said limits but operable to open said circuit upon temperature rise or fall to additional predetermined upper and lower levels in excess of said first mentioned limits, means to operate said switches, and a single means to vary said first mentioned upper and lower limits and said additional predetermined limits, said means being so arranged that upon variation of said first mentioned limits said additional limits are varied in differential ratio, whereby as said upper limits are raised said difference therebetween tends to converge and as said lower limits are correspondingly raised said difference therebetween tends to diverge.

3. In a control mechanism, in combination, a switch operable to close and open a circuit on temperature rise and fall respectively to predetermined upper and lower limits, a second switch adapted to remain closed during temperature rise and fall within said limits but operable to open said circuit upon temperature rise or fall to additional predetermined upper and lower limits in excess of said first mentioned limits, means to operate said switches, and a single means to change said first mentioned predetermined upper limit and said additional predetermined upper limit, said means being so arranged that upon raising of said first mentioned limits said additional limits are raised in differential ratio, whereby said difference therebetween tends to converge.

4. A device of the character described, comprising, in combination, a switch operable to actuate a circuit on temperature change beyond predetermined upper and lower limits, a second switch adapted to remain inoperative during temperature rise and fall within said limits but adapted to operate said circuit upon temperature rise or fall to additional predetermined upper and lower limits in excess of said first mentioned limits, means to operate said switches, and a single means to raise said first mentioned lower limits and said additional lower limits, said means being so arranged that upon increase of said first mentioned limits said additional limits are also increased but by a lesser amount whereby said difference therebetween tends to diverge.

5. A device of the character described, comprising, in combination, a condition responsive element, a cam associated with said element, a switch operated by said cam, a disc mounted adjacent said cam, a lever associated with said disc, a cam follower associated with said lever, a switch mounted on said lever, and means to rotate said disc, said rotation of said disc being transmitted to said cam follower to change its position relative to the surface of said cam.

6. A device of the character described, comprising, in combination, a condition responsive element, a switch associated with said element, means to vary the condition value to which said element is responsive, said means also acting to change the position of said switch with respect to said element, said means comprising a pivoted lever extending between said value changing means and said switch, and latch means engageable with said lever to maintain said switch in one position under certain predetermined conditions.

7. A device of the character described, comprising, in combination, a condition responsive element, a cam operated by said element, a movable disc mounted adjacent and coaxially aligned with said cam, a lever associated with said disc, a cam follower mounted on said lever, means to move said disc and hence said cam follower, switch means carried by said lever and actuated by said cam follower, and means to hold said cam follower from engagement with said cam surface under predetermined conditions to preclude actuation of said switch means.

8. A device of the character described, comprising, in combination, a condition responsive element, a cam operated by said element, a movable disc mounted adjacent and coaxially aligned with said cam, a lever associated with said disc, a cam follower mounted on said lever, means to move said disc and said cam follower, a mercury switch carried by said lever and actuated by said cam follower, a second cam mounted on said first cam and also operable to engage said cam follower, and means to hold said cam follower from engagement with said cam surface under predetermined conditions to preclude actuation of said switch means.

9. A device of the character described, comprising, in combination, a temperature responsive element, a switch associated with and operable by said element, a cam movable by said element, a lever, a cam follower mounted on said lever adjacent said cam, a second switch carried by said lever whereby said cam operates said second switch, and means to vary the temperature value at which said second switch will operate through said element with respect to the temperature at which said first switch will operate through said cam movable by said element.

10. A device of the character described, comprising, in combination, a temperature responsive element, a switch associated with and operable by said element, a cam movable by said element, a lever, a cam follower mounted on said lever adjacent said cam, a second switch carried by said lever whereby said cam operates said second switch, and means to vary the temperature value at which said second switch will operate through said element with respect to the temperature at which said first switch will operate through said cam movable by said element, and independent manual means adapted to control the operation of said second switch.

11. A device of the character described, comprising, in combination, a temperature responsive element, a switch associated with and operable by said element, a cam movable by said element, a lever, a cam follower mounted on said lever adjacent said cam, a second switch carried by said lever whereby said cam operates said second switch, means to vary the temperature at which said second switch will operate through said element with respect to the temperature at which said first switch will operate through said cam movable by said element, and independent means adapted to control the operation of said second switch, said manual means comprising a second lever having a latching surface thereon, said surface being adapted to engage said cam follower.

12. A device of the character described, comprising, in combination, a condition responsive element, a rod actuated by said condition responsive element, a cam mounted on said rod for rotation therewith, a lever, a cam follower mounted on said lever, a switch associated with said lever, said switch being normally actuated by response of said cam follower to the movements of said cam, and means to latch said switch, said means comprising an extending lever pivotally mounted on said rod, said lever having a latching surface thereon adapted to engage said cam follower.

13. A device of the character described, comprising, in combination, a cam, means to rotate said cam, a cam follower mounted upon a bell-crank member adjacent said cam, a switch also carried by said bell-crank member, a lever associated with said bell-crank member, a rotatable disc, a link connecting said disc with said lever, and means to rotate said disc, the arrangement being such that rotation of said disc varies the position of said cam follower and said switch with respect to said cam, whereby said switch is actuated by a greater or less rotation of said cam.

14. A device of the character described, comprising, in combination, a cam, a thermally responsive element adapted to rotate said cam, a cam follower mounted upon a bell-crank member adjacent said cam, a switch also carried by said bell-crank member, a lever associated with said bell-crank member, a rotatable disc, a link connecting said disc with said lever, and means comprising a handle to rotate said disc, the arrangement being such that rotation of said disc varies the position of said cam follower and said switch with respect to said cam, whereby said switch is actuated by a greater or less rotation of said cam occasioned by a greater or less temperature change affecting said element.

15. A device of the character described, comprising, in combination, a cam, a thermally responsive element adapted to rotate said cam, a cam follower mounted upon a bell-crank member adjacent said cam, a switch also carried by said bell-crank member, a lever associated with said bell-crank member, a rotatable disc, a link connecting said disc with said lever, means comprising a handle to rotate said disc, the arrangement being such that rotation of said disc varies the position of said cam follower and said switch with respect to said cam, whereby said switch is actuated by a greater or less rotation of said cam occasioned by a greater or less temperature change affecting said element and latch means to hold said cam follower away from said cam to render said switch inoperative under certain predetermined conditions.

16. A device of the character described comprising, in combination, a cam, a thermally responsive element adapted to rotate said cam, a bell-crank member, a cam follower mounted on said bell-crank member adjacent said cam, a switch also carried by said bell-crank member, a rotatable disc, a link connecting said disc with said lever, means comprising a handle to rotate said disc, the arrangement being such that rotation of said disc varies the position of said cam follower and said switch with respect to said cam, whereby said switch is actuated by a greater or less rotation of said cam occasioned by a greater or less temperature change affecting said element, latch means to hold said cam follower away from said cam to render said switch inoperative under certain predetermined conditions, and means associated with said cam and actuated by said thermally responsive element to release said latch means under other predetermined conditions.

17. A device of the character described comprising in combination, a cam, a thermally responsive element adapted to rotate said cam, a bell-crank member, a cam follower mounted on said bell-crank member adjacent said cam, a switch also carried by said bell-crank member, a rotatable disc, a link connecting said disc with said lever, means comprising a handle to rotate said disc, the arrangement being such that rotation of said disc varies the position of said cam follower and said switch with respect to said cam, whereby said switch is actuated by a greater or less rotation of said cam occasioned by a greater or less temperature change affecting said element, latch means to hold said cam follower away from said cam to render said switch inoperative under certain predetermined conditions, manual means to release said latch and additional means to release said latch independently of said manual means in response to an increase in the temperature value controlling said thermally responsive element.

CARL G. KRONMILLER.